INVENTORS
FRED L. STEWART &
MERRILL H. TERRY

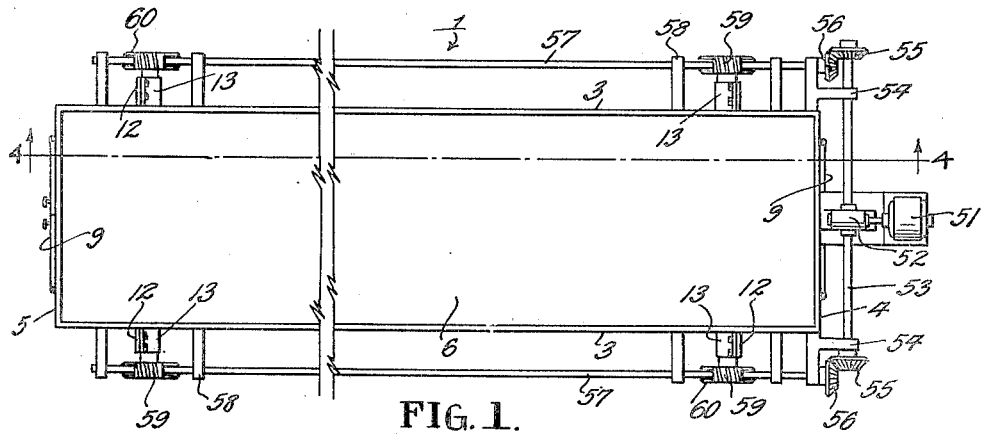
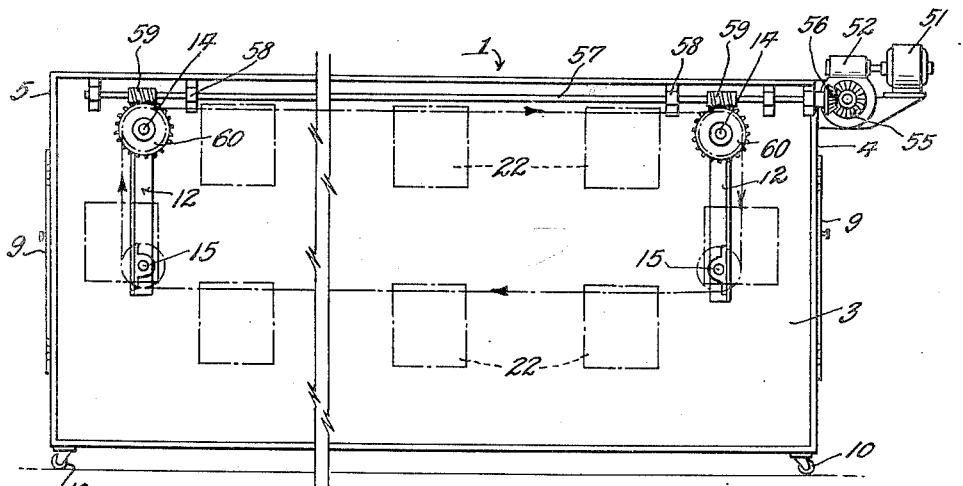
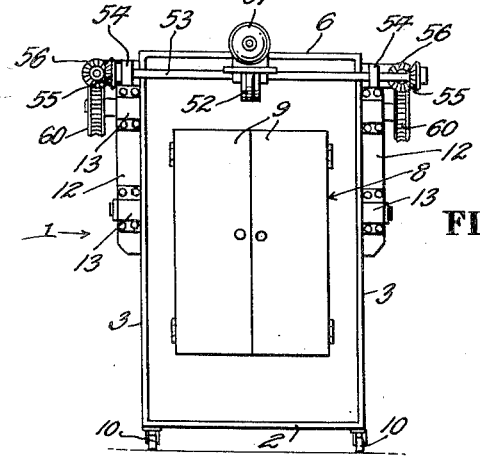

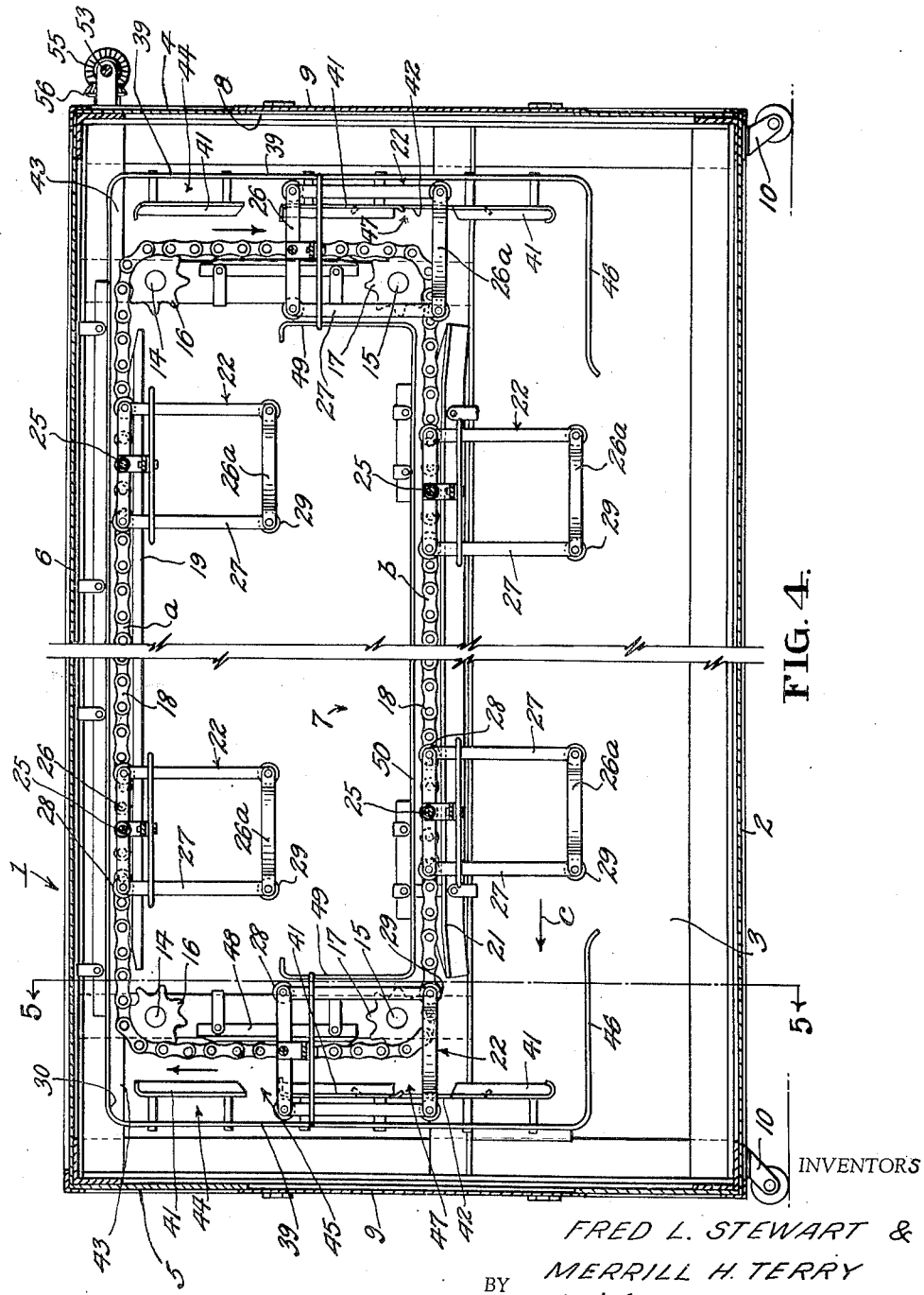

INVENTORS
FRED L. STEWART &
MERRILL H. TERRY

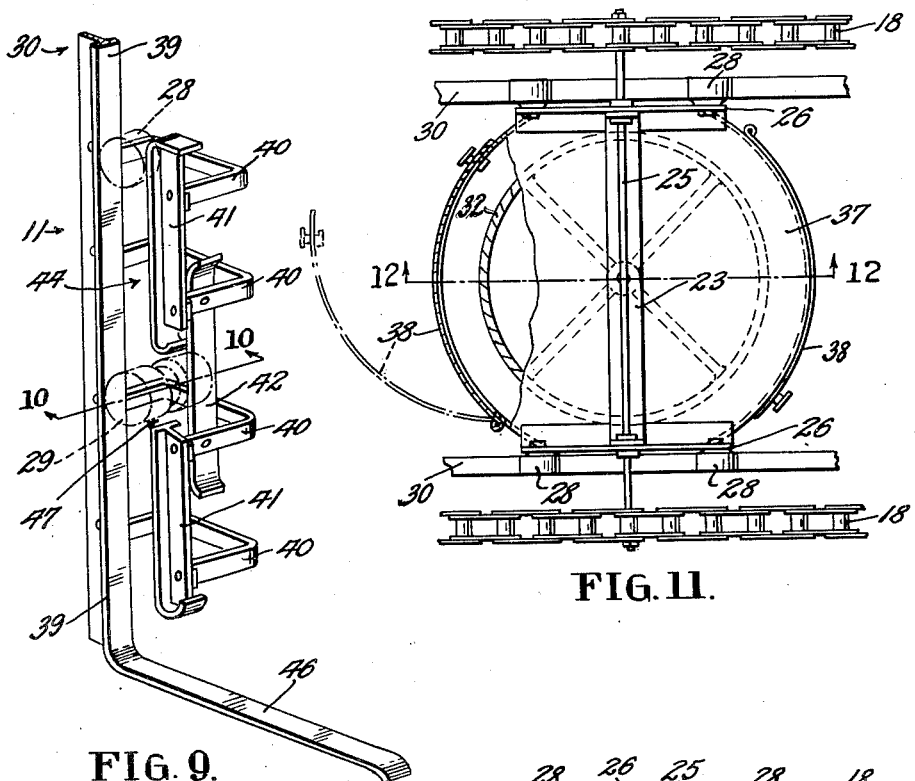
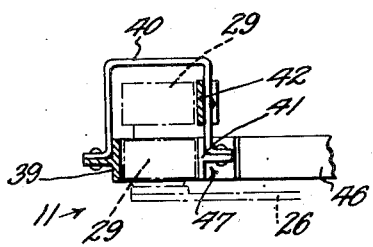
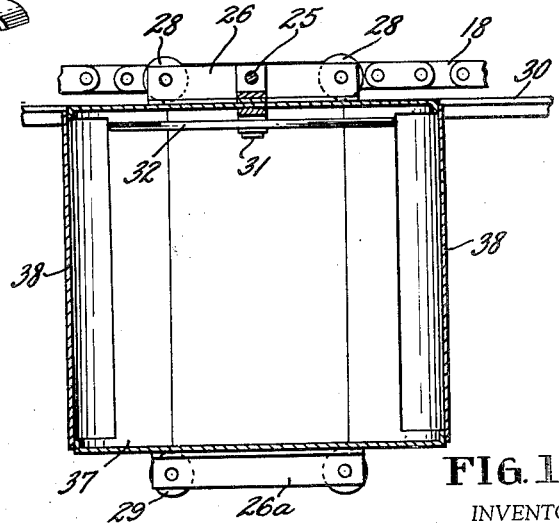

March 30, 1954  F. L. STEWART ET AL  2,673,779
ENDLESS ARTICLE-CARRYING AND STORING SYSTEM
Filed April 17, 1952  6 Sheets-Sheet 6

INVENTORS
FRED L. STEWART &
MERRILL H. TERRY
BY W. N. McDowell
ATTORNEY

Patented Mar. 30, 1954

2,673,779

UNITED STATES PATENT OFFICE 2,673,779

ENDLESS ARTICLE-CARRYING AND STORING SYSTEM

Fred Lee Stewart and Merrill H. Terry, Columbus, Ohio

Application April 17, 1952, Serial No. 282,917

12 Claims. (Cl. 312—223)

This invention relates to endless carriers, having particular reference to an improved endless carrier system for use in article-retaining and storing systems.

In the handling of many articles, for instance, garments of wearing apparel received by fabric-cleaning establishments, there exists an urgent need for compactness in storage space together with convenience and accessibility in the matter of inserting and removing individual articles into and from storage areas. Those engaged in the dry-cleaning industry are often required to handle a large number of separate articles of wearing apparel owned by different patrons. When a particular garment or article is required for delivery, considerable time is often consumed in locating the particular article desired, since most commonly such articles are contained on rack-positioned hangers supported over a large area of valuable floor space which may be used to better advantage in other capacities.

It is an object of the present invention to provide an improved mechanical system by which such articles may be stored systematically in a protected, accessible, and floor-space saving manner, so that the articles may be readily inserted in an orderly compact array on travelling supports arranged in a confined chamber within the system; which supports may be reached when required for removal of the articles from storage space, provision being made for the storage of a maximum number of articles in said chamber.

Another object of the present invention is to provide in apparatus of this character a compact, endless power-driven carrier having guide means associated therewith for effecting support of a pair of endless chains driven to travel in spaced vertical planes and around substantially rectangular orbits or paths of travel, the chains carrying between them suspended supports which are adapted for the reception of the articles or products to be stored.

Another object of the invention is to provide an endless power-driven article-supporting carrier of the character indicated with associated means for bringing selectively various article supports thereon, while the same are moving vertically, into registry with one or more door-controlled access openings provided at an end or ends of a storage chamber or room in which the carrier is movably mounted, the access opening or openings enabling garments, or other articles, to be placed on the carrier supports of the mechanism or removed therefrom as required, thereby enabling loading and unloading operations to be performed from a fixed position and from which the articles through control of the carrier are readily accessible.

Other objects of the invention are to provide endless motor-driven means of an article-storage system of the character set forth with a plurality of longitudinally spaced article-supporting devices which are suspended from the endless carrier means; to provide apparatus wherein each of the supporting devices embodies an outer cage or frame structure having upper and lower sets of guide rollers; to provide a guide rail means in such a carrier system with which guide rollers on article carriers are engaged during vertical travel of the article carriers, the rail means functioning in a manner positively retaining the devices against undesired lateral or horizontal movement during their vertical travel; to provide in such a system improved switch means in association with the article supports or carriers for arresting selectively movement thereof when in desired registry with an access or discharge door opening; and to provide apparatus for the storage of articles which improves generally prior apparatus of a related character.

For a further understanding of the invention, reference is to be had to the following description and the accompanying drawings, wherein:

Fig. 1 is a top plan view of my improved endless carrier storage system;

Fig. 2 is a side elevational view thereof;

Fig. 3 is a front elevational view;

Fig. 4 is a vertical longitudinal sectional view taken through the apparatus on the line 4—4 of Fig. 1;

Fig. 9 is a detail perspective view disclosing one of the vertical guides for the roller chains of the system;

Fig. 10 is a detail horizontal sectional view on the line 10—10 of Fig. 9;

Fig. 11 is a plan view, partly in horizontal section showing a closeable door-equipped product carrier;

Fig. 12 is a sectional view on the line 12—12 of Fig. 11;

Figure 5:
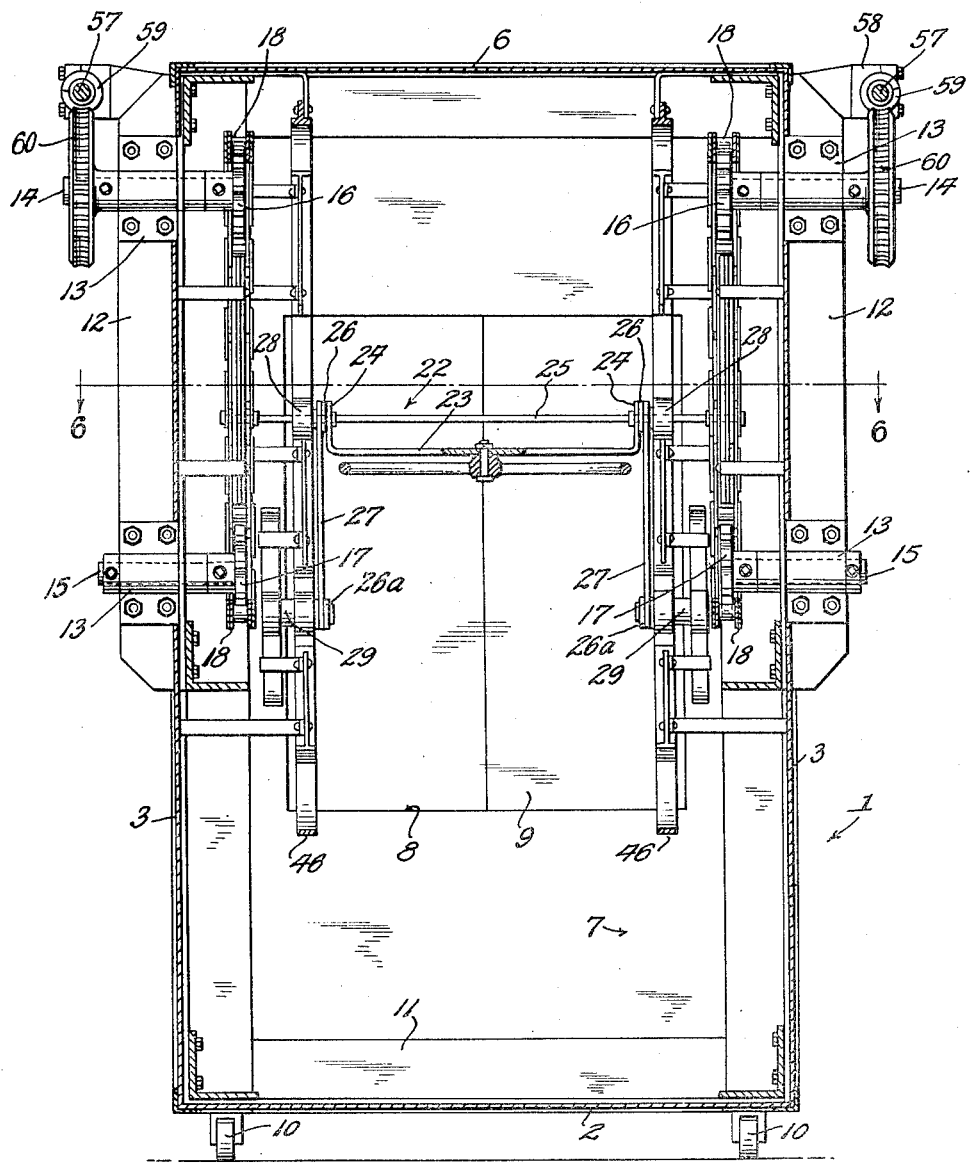
Fig. 5 is a transverse vertical sectional view taken on the plane indicated by the line 5—5 of Fig. 4.
Figure 6:
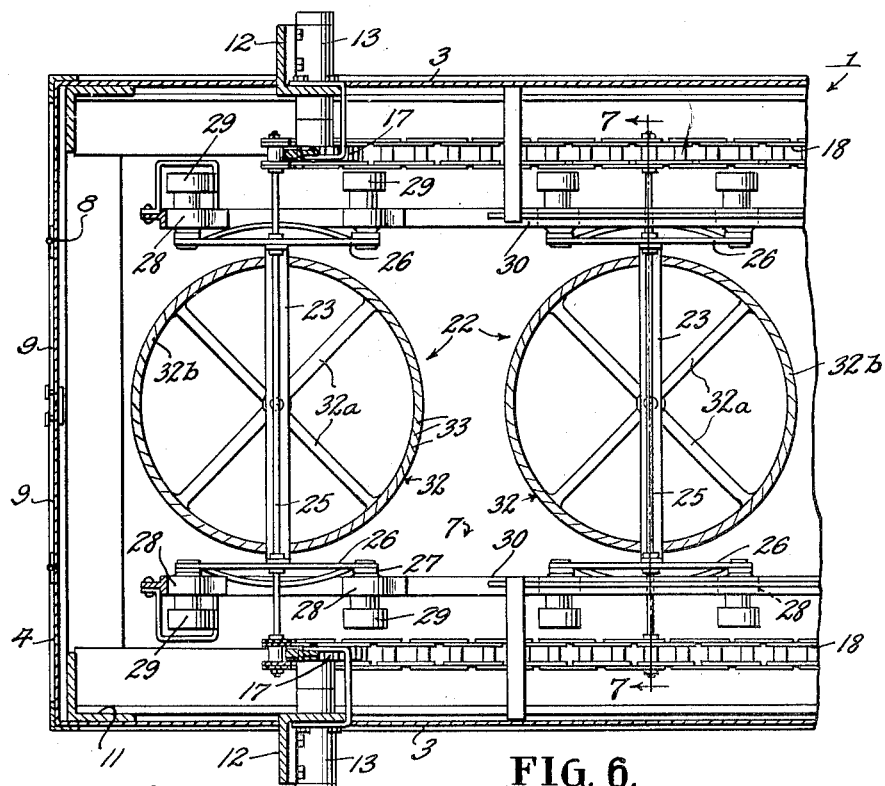
Fig. 6 is a horizontal sectional view, the plane of which being indicated by the line 6—6 of Fig. 5.

The endless carrier mechanism, employed by the present invention in the handling and storing of various products, may comprise a building, room or cabinet, indicated at 1 in the drawings. In this instance a cabinet has been disclosed, so formed as to include a bottom wall 2, spaced parallel upstanding side walls 3, vertical front and back walls 4 and 5, respectively, and a top wall 6. These walls of the cabinet define an internal storage chamber 7, there being an access opening 8 formed in one or both of the front and back walls 4 and 5, providing communication from the exterior of the cabinet to the interior thereof, the opening or openings 8 being normally closed by doors 9. In this instance, the bottom wall 2 of the cabinet is equipped with caster wheels 10, providing portability on the part of the cabinet. Interiorly the cabinet is formed to include a frame 11 with which the outer walls of the cabinet are suitably connected. The frame 11 provides a substantial supporting means for the endless article-carrying means of the present invention, such means being arranged in the chamber 7.

The frame 11 includes exteriorly positioned vertically extending angle members 12. Mounted on these angle members are journal boxes 13 in which are rotatably supported, on each side of the cabinet, and adjacent to each end thereof, upper pairs of longitudinally spaced and horizontally extending, chain-driving shafts 14. Beneath the latter the boxes 13 support spaced pairs of lower, similarly disposed, and vertically registering horizontal shafts 15. In a manner to be hereinafter described, rotating power is applied to each of the upper shafts 14. Within the confines of the chamber 7, the relatively spaced inner ends of the shafts 14 carry sprockets 16, while the lower shafts 15 have their inner ends equipped with vertically registering sprockets 17.

Passing around these sprockets and driven and guided thereby are endless roller chains 18. These chains are disposed in transversely spaced order and arranged adjacent to the side walls 3 of the cabinet. The upper run a of these chains is driven so that it travels toward the front wall 4 of the cabinet. After passing around the upper and forward pair of the sprockets 16, the chains are directed vertically downward, and move in parallelism with the front wall 4, but in a plane spaced inwardly from said front wall. At the conclusion of their downward travel along the front of the cabinet, the chains pass around the forwardly situated of the lower sprockets 17, so that the lower run b of each of the chains 18 travels horizontally toward the rear wall of the cabinet. After passing around the lower rear pair of sprockets 17, the chains move upwardly in spaced parallel relation with the back wall 5 of the cabinet, traveling vertically and linearly in an upward direction. After this, chains pass around the rear pair of the upper sprockets 16 and move forwardly in parallel relationship with and beneath the top wall 6 of the cabinet, along their upper runs a.

Figure 7:
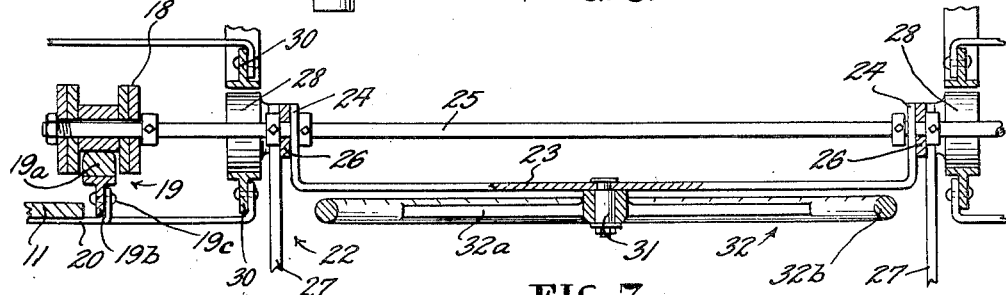
Fig. 7 is a transverse vertical sectional view on the line 7—7 of Fig. 6.

While traveling along their upper runs a, the rollers of the chains 18 engage with stationary longitudinally extending guiding and supporting tracks 19, which are stationarily supported in connection with the frame 11 by means of the bracket devices or their equivalents 20, shown in Fig. 7. Each of the tracks 19 comprises a chain-contacting bar 19a and a T-shaped supporting bar 19b with which the head bar 19a is joined. The vertical flange of each of the bars 19b is united as at 19c with an end of a bracket 20. The lower run b of each of the chains contacts with a track 21 which corresponds in construction with the track 19. These frame-carried tracks sustain the weight of the chains and the article supports carried thereby, limiting the work of the sprockets 16 and 17 to that of driving the chains and guiding the same in their substantially rectangular orbits of travel.

Arranged between and carried by the chains 18 are article-carrying and supporting means. In the form of the apparatus illustrated, such means may comprise advantageously a series of longitudinally spaced article-receiving devices, indicated at 22. Each of these devices, in a preferred embodiment of the invention, includes a yoke-shaped bar 23, the latter having up-turned ends 24 suitably perforated to receive a cross shaft 25. The opposite ends of each of the shafts 25 are journaled in registering openings formed in the rollers and links of the chains 18, so that the shaft 25 will be carried by and move in unison with said chains, but will not interfere with the flexing thereof as the same pass around the sprockets 16 and 17.

Each of the devices 22 is further formed to include a pair of horizontally extending, transversely spaced, parallel, upper and lower pairs of horizontally extending arms 26. One of the cross shafts 25 passes centrally through each of the upper arms of said devices. The outer ends of these upper arms are each connected by means of vertical links 27 with the outer ends of the lower pairs of arms indicated at 26a. At their outer ends, the upper arms 26 carry single rollers, indicated at 28, and the lower of said arms 26a carry at their ends dual guide rollers, indicated at 29. The single upper rollers 28 are mounted for movement between upper and lower parallel substantially T-shaped rails, indicated at 30, and which form a part of an internal carrier-guiding structure of the cabinet. These means provide cooperatively antifriction guides for sustaining the carriers 22 while the latter are traveling horizontally and also vertically in connection with the upper and lower runs of the endless belts or chains 18.

Figure 8:
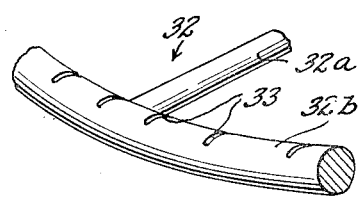
Fig. 8 is a detail perspective view disclosing fragmentarily the peripheral portion of one of the rotatable garment-supporting racks.
Figure 8A:
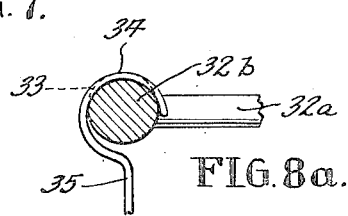
Fig. 8a is a detail sectional view of one of the racks.

While the construction of the article carriers will vary considerably in accordance with the particular nature of the articles being handled, stored or displayed, it has been found that when the apparatus is adapted for employment in dry-cleaning establishments, the yoke 23 may be provided midway of its length with a depending stud 31 for each device. Suitably mounted on this stud, as illustrated in Fig. 7, is a carrier ring 32, the latter including radiating arms 32a and a circumferential rim 32b. The rim, if desired, may be notched or grooved at intervals as indicated at 33, which grooves, as shown in Fig. 8a, are adapted to receive the standard hook 34 provided on a conventional clothes hanger 35, whereby a number of garments may be mounted on the rotatable rim 32 and suspended from the periphery thereof. By this means, the articles are readily accessible when brought into registry with an access opening 8 provided in one or both of the ends of the cabinet.

A modified form of carrier has been illustrated in Figs. 11 and 12, wherein the carrier 36 includes an outer casing 37, which completely encases the ring 32 and the garments suspended therefrom, so that in the event a garment should fall accidentally from the hangers on which they are mounted, the same will be retained within the casing 37 and prevented from being injured or damaged by the mechanism of the present invention. Each of the casings 37 is provided with one or more hinged doors 38, providing convenient access to the interior of each casing for the examination, removal or introduction of garments, or other articles or products, to be arranged within the casing. It will be understood that if desired the interior of the cabinet may have the atmosphere therein modified, filtered or otherwise to remove dust and other foreign particles, and/or by having its temperature regulated. Often, in the storing of fur garments, particularly, low temperatures, such as those obtained by refrigeration, are required, and such arrangements and variations are within the scope of the invention. Atmosphere conditioning may be done when the storage and display of food products is carried on.

As the carriers or cages 22 move downwardly and vertically at the front of the cabinet, or upwardly and vertically at the rear thereof, it is important that the cages or carriers be securely guided and prevented from swaying or tilting laterally about axes provided by their suspension shafts 25. To this end the rails shown at 30, and which are arranged at the top and at each side of the casing, extend vertically downward, as at 39, at the front and back ends of the cabinet. At their extreme lower ends these downwardly extending rails 39 project longitudinally and horizontally inwardly as at 46 for a limited distance into the storage chamber 7.

The rails 39, as shown more particularly in Fig. 9, carry at vertically spaced intervals rigid laterally and horizontally disposed stirrups, shown at 40. Supported by these stirrups are parallel inwardly arranged, vertically aligned, auxiliary rails 41. A pair of these vertical rails 41 cooperates with each of the rails 39, the rails 41 being interrupted in the length thereof so that the rollers move into and out of engagement with the rails 39. The intermediate stirrups 40 carry a short vertical rail section 42 on each side of the cabinet. The rail sections 42 are arranged so that they are offset laterally and inwardly with respect to the rails 41. By being so positioned the rail sections 42 engage only with the dual rollers 29 on the bottoms of the cages, so that the latter will, at all times be held against vertical oscillatory movement during vertical travel between the upper and lower runs $a$ and $b$ of the endless conveyors.

By reference to Fig. 4, it will be seen that the auxiliary rails 41 at the front and top of the cabinet are spaced from the rails 30 to provide a space or gap 43 on each side of the cabinet which will permit the single upper rolls 28 of the cages or carriers to pass through said space or gap into registry with the vertically extending guide channel 44 which is formed between the rail sections 41 and 39. Simultaneously, the dual rolls 29 of the cage or carrier 22, upon being registered with the rails 39, pass through the gap or gaps shown at 45, until the rolls 29 contact with the surfaces of the rails 39, at which time the chains 17 will be moving downwardly, carrying the cages with them.

This downward movement is continued until the lower set of rollers 29 contacts with the horizontal extensions 46 provided at the lower ends of the rails 39, and are disposed below the lower ends of the lowermost of the vertically aligned auxiliary rails 41. At this time the upper rolls 28 of the cages or carriers register with the gap 47 formed between the adjacent rail sections 41, permitting of the horizontal and inward movement of the cages or carriers, as indicated by the arrow $c$ in Fig. 4. The rail section 42 on each side of the casing is utilized to prevent any swaying movement on the part of the cages or carriers as the latter are moving downwardly and vertically at the time the dual rollers 29 thereof register with the gap 47, as in the position indicated by the dotted lines in Fig. 9 and before the cages reach during their descent their lowermost position of travel. Thus sustained guiding movement is imparted to the carriers during their full descent and undue lateral movement thereof is precluded.

During the travel of the conveying means, when moving in parallelism with the front and back of the cabinet, the vertically moving lengths of the chain 18 engage with track bars shown at 48 carried by the internal frame structure of the cabinet in a stationary manner. Also, during such vertical travel, the rolls 28 and 29 are guided by track extensions shown at 49, the extensions 49 at their lower ends merging into the horizontal guide tracks shown at 50, the latter engaging with the upper guide rolls 28 when the cages or carriers 22 travel horizontally with the lower runs of the conveyor chains. This construction is substantially duplicated at both ends of the cabinet where the cages or carriers move vertically.

Motion may be imparted to the chains by the provision of an electric motor shown at 51. In this instance the motor has its armature shaft positioned to drive a speed-reducing mechanism mounted in the casing disclosed at 52. This speed-reducing mechanism drives a horizontally journaled shaft 53, disposed exteriorly of the casing at the rear end thereof. The ends of the shaft 53, adjacent journal brackets 54, are equipped with beveled gears 55, which mesh with corresponding gears 56 provided on the rear ends of longitudinally extending drive shafts 57. These shafts are journaled as at 58 in connection with bearings mounted on the sides of the cabinet and are equipped with worms 59 which mesh with worm gears 60 carried by the outer ends of the shafts 14. Preferably, through the operation of automatic position-controlling switch mechanisms, hereinafter defined, the motor 51 may be operated to align selectively and automatically any one of the cages or carriers with an access door or doors of the cabinet.

In controlling the movement of the endless chains so that any one of the article-supporting frames or cages may be stopped during vertical travel thereof while in registry with an access opening, there is provided an automatic control mechanism. This mechanism may be and preferably is of the type shown in Figures 13 through 16 of the drawings. However, we do not limit ourselves to the precise details of the mechanism disclosed, as it will be understood that the same are subject to certain variation.

However, as illustrated, this stop mechanism comprises a circuit for the motor 51 which includes conductor lines 65 and 66 leading to a suitable source of current supply, there being a control rheostat 67 in the line 65 and a safety fuse 68 in the line 66. Joined with the line 65 is a conductor 69 from which extend branch conductors 70, each of the latter having incorporated therein a normally open manually closed switch 71. Each of the conductors 70 extends to a field coil 72 of one of a plurality of relays 73. Each relay includes an armature 74 carrying a contact head 75 at one end thereof.

Figure 14:
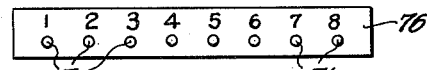
Fig. 14 is a detail front elevational view of the control switch panel.

The switches 71 are preferably arranged in the panel 76 shown in Fig. 14, there being one of the switches 71 for each of article-supporting frames or cages 22. On the face of the panel 76, adjacent to each of the switches 71, there appears a row of numerals, or other identifying symbols, which correlate a particular frame or cage 22 with one of the switches 71. By manually closing a switch 71, the control mechanism then operates automatically to bring a frame or cage, correlated with the actuated switch, into registry with an access opening of the apparatus and to stop the movement of the frame or cage when such registry obtains.

The momentary excitation of a relay coil 72 produced by the closure of an associated manual switch 71, causes movement of the affected relay armature 74 so that its head 75 bridges spaced contacts provided in the lines 66 and 66a, thereby completing the circuit to the motor 51. The armature of the relay remains in its position of circuit closure so that the endless chains of the apparatus controlling the movement of the article carriers will be operated until the particular carrier selected by the operator of a manual switch 71 is brought into alignment with an access opening in an end wall of the apparatus housing.

Figure 15:
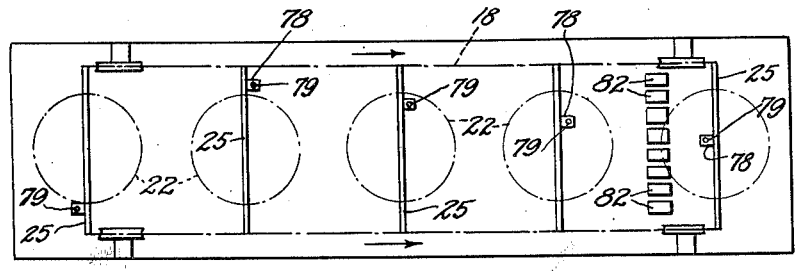
Fig. 15 is a diagrammatic top plan view of the carrier-mounted switch for the control motor.
Figure 16:
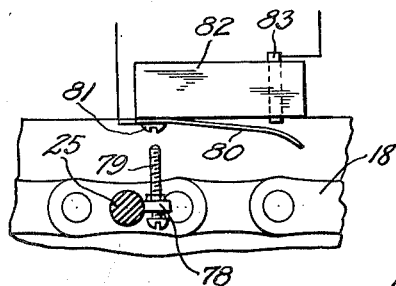
Fig. 16 is a detail sectional view of one of the carrier-actuated switches.

When such alignment is effected, the operation of the motor 51 is automatically arrested by the opening of the motor circuit. This is accomplished by providing each of the rods 25 (see Fig. 16) with a lug 78 from which an adjustable set screw 79 projects upwardly. The set screws carried by the different rods 25 are each displaced relative to the remaining set screws longitudinally of the rods, as shown in Fig. 15. The relays 73 are stationarily mounted in a horizontal row in the cabinet of the apparatus, and each relay includes a resilient reed 80. Each reed is fixed at one end, as at 81, and has its opposite or free end spaced and depending from a relay housing 82. The outer end of each reed is disposed so that it will be engaged by but one of the set screws 79 and when so engaged the reed will flex to an extent causing its engagement with a stationary contact 83 which is electrically joined with the conductor 69.

Figure 13:
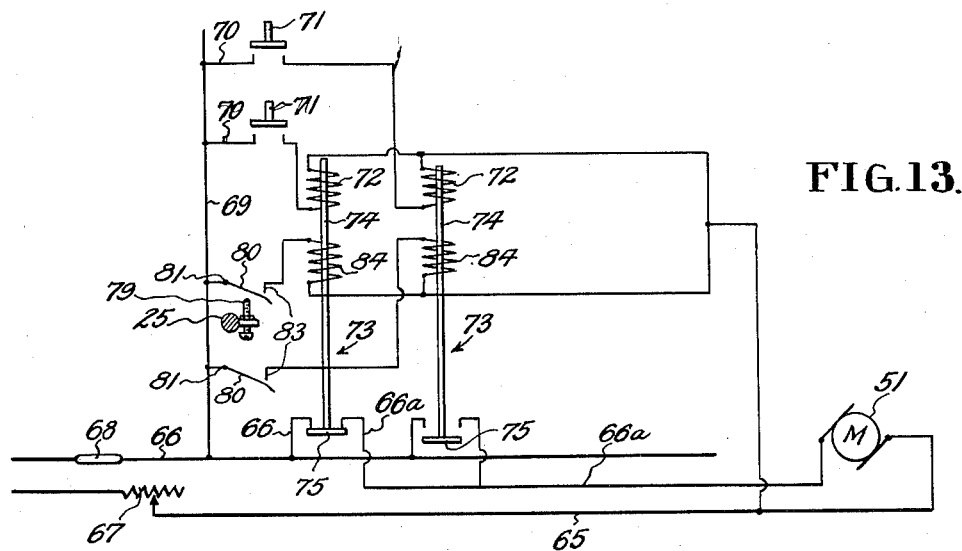
Fig. 13 is a diagrammatic view of the control circuit in which the carrier motor is arranged.

This operation provides for current flow from the conductor 69 and through the particular reed 80 in contact with the engaged set screw, so that a field coil 84 of the relay oppositely wound with respect to the coil 72, will be energized to attract and move its associated armature in a direction opposite to that produced by the coil 72, so that the head 75 will occupy positions as shown at the right of Fig. 13, whereby the motor 51 is deenergized.

It will be seen that the present invention thus provides storage apparatus by which a number of articles of merchandise or the like may be placed in grouped order in conveyor-mounted carriers, this being accomplished in such manner that a maximum number of articles may be stored with the use of but a minimum amount of floor space. In addition, the construction of the apparatus is such that the individual articles supported in each of the carriers is conveniently accessible, this being accomplished by the automatic means for stopping any one of the carriers in selective registry with a door-controlled access opening formed in one or both ends of the apparatus enclosure. While moving in unison with the endless conveyors, the article carriers are pivotally suspended from the conveyors and travel on longitudinally and horizontally extending tracks. It will be observed that the construction of the apparatus is such that when the carriers are moving vertically, the same are guided so that they can not swing about their pivotal unions with the conveyors. By forming the carriers to comprise cages, the articles contained therein are sufficiently enclosed so that if for any reason the same should accidentally fall, the falling articles will be held within the confines of the carriers and thereby removed from injury through contact with the conveyor mechanism.

While I have set forth and described in detail certain preferred embodiments of the present invention, nevertheless it will be understood that the invention is subject to other mechanical variation or modification without departing from the spirit of the invention or the scope of the following claims.

We claim:

1. In conveyor-type storage apparatus: a frame, a pair of vertically disposed transversely spaced endless conveyor belts, rotatable guiding and driving elements mounted on said frame, said elements engaging said belts and being arranged to cause the belts to travel in registering substantially rectangular orbits of movement in which the belts travel in upper and lower longitudinally extending substantially horizontal runs and vertically extending end runs, unitary article carriers arranged between said belts; means pivotally suspending each of said carriers from said belts, upper and lower sets of guide rollers mounted on each of said carriers; each set of rollers including longitudinally spaced forwardly and rearwardly disposed pairs of said rollers, stationary horizontal and longitudinally extending track rails carried by said frame and on which the upper set of rollers only of each carrier operates to support the carriers during travel along the upper and lower horizontal runs of said belts, vertical guides carried by said frame for guiding contact with both sets of rollers during at least part of the travel of said carriers along the vertical end runs of said belts, and means for imparting driving movement to the belts and carriers joined therewith.

2. In conveyor-type storage apparatus: a frame, a pair of vertically disposed and transversely spaced flexible and endless conveyor belts, rotatable guiding and driving elements carried by said frame, the relative arrangement of said elements being such as to cause said belts to travel in registering substantially rectangular orbits, in which the belts follow upper and lower longitudinally extending and substantially horizontally disposed runs and vertically extending end runs, unitary article carriers each formed for the support of a plurality of articles, means pivotally suspending said carriers at longitudinally spaced intervals from said belts, upper and lower sets of guide devices mounted on each of said carriers, each of said sets including longitudinally spaced forwardly and rearwardly disposed pairs of said devices which are disposed in the same plane, stationary horizontal and longitudinally extending rails carried by said frame and with which the upper set only of guide devices contact in effecting the support of said carriers for travel along the upper and lower longitudinal runs of said belts, vertical rails carried by said frame for guiding contact with both the upper and lower sets of guide devices of said carriers during at least part of the travel of the latter along the vertical end runs of said belts, and motor actuated means operative in conjunction with said driving elements for imparting operating movement to the belts and the carriers joined therewith.

3. In storage apparatus, a pair of adjacently arranged vertically disposed endless conveyor belts, a frame, driving and guiding means carried by said frame for effecting confined travel of said belts in substantially rectangular orbits, a plurality of unitary article carriers each adapted for the support of a plurality of articles arranged between said belts, means flexibly uniting said carriers at their upper ends at longitudinally spaced intervals with said belts, upper and lower sets of rollers mounted on each of said carriers, each of said sets including a forward and a rearward pair of said rollers disposed in the same plane, longitudinally and horizontally extending stationary guide rails carried by said frame, said guide rails receiving the upper set only of rollers on each of said carriers during movement of the latter lengthwise of their orbits of travel, transversely spaced and vertically extending stationary guide rails cooperative with the ends of said longitudinal rails in providing for rectangular orbital movement of said carriers, said vertical rails being disposed to receive and engage both the upper and lower sets of rollers of said carriers during at least a part of their vertical movement whereby to confine the latter to vertical movement only at the ends of their travel orbits, said vertical rails precluding lateral tilting movement of the carriers about their flexible connections with said belts.

4. In conveyor-type storage apparatus: a frame, a pair of vertically disposed transversely spaced endless link-type roller chains, rotatable driving and guiding sprockets journaled in said frame, said sprockets being arranged to receive said chains in a manner causing the chains to travel in registering substantially rectangular orbits of movement, unitary article carriers arranged at longitudinally spaced intervals between said chains in pivotally suspended union therewith, upper and lower sets of guide devices mounted on each of said carriers, each of said sets comprising longitudinally spaced forwardly and rearwardly disposed pairs of said devices, stationary horizontally and longitudinally extending track rails carried by said frame and on which rails the upper set of guide devices only of said carriers operate during movement of the carriers lengthwise of the apparatus, substantially vertically disposed guide rails carried by said frame for engagement with the forward and rearward pairs of both sets of guide devices during at least part of the travel of said carriers vertically at the ends of said apparatus, and means for imparting driving movement to the chains and the carriers joined therewith.

5. In conveyor-type storage apparatus: a frame, a pair of transversely spaced endless conveyor belts, the latter having going and return runs disposed in coinciding vertical planes, rotatable guiding and driving elements carried by said frame, the arrangement of said elements being such as to cause said belts to travel in registering substantially rectangular orbits of movement in which the belts advance along upper and lower longitudinally extending substantially horizontal runs and vertical end runs, longitudinally spaced article carriers arranged between said belts, cross members carried by said belts, means pivotally suspending said carriers from said cross members, upper and lower sets of guide rollers mounted on each of said carriers, each of said sets comprising four rollers arranged in the same plane at the corners of said carriers at the top and bottom thereof and guide rails carried by said frame with which said rollers engage for their support and guidance during their movement in unison with said belts, the lower set of rollers having engagement with said guide rails during at least a part of the vertical movement only of the carriers, said lower set of rollers being otherwise spaced at all times from said guide rails.

6. In conveyor-type storage apparatus: a frame, endless conveyor means supported for rectangular orbital movement on said frame, longitudinally spaced article carriers pivotally suspended from said conveyor means, upper and lower sets of guide rollers mounted on each of said carriers, each of said sets including a forwardly and a rearwardly placed pair of said rollers, the latter being disposed at the top and the bottom of said carriers stationary horizontally and longitudinally extending track rails carried by said frame and with which the upper set of rollers only of said carriers cooperate, vertical rails carried by said frame for engagement with both sets of rollers of said carriers while the latter are moving vertically through at least a part of their travel at the ends of said frames and in unison with said conveyor means, means for imparting driving movement to the conveyor means and the carriers supported thereby, and walls disposed about said frame defining an enclosure in which said conveyor means and carriers are positioned, an end wall of said enclosure being formed with an access opening into selective registry with which said carriers are positionable.

7. Storage apparatus as defined in claim 6, and further characterized by the provision of means for driving said conveyor means, said last-named means including an electric motor having an operating circuit, switch means for opening and closing said circuit, and means for controlling the operation of said switch means to arrest movement of said conveyor means in a manner registering selected carriers with said access opening.

8. An article carrier for storage systems of the conveyor type, said carrier comprising a conveyor mounted cross rod, a yoke member having upturned ends apertured to receive said cross rod, spaced parallel longitudinally extending frame bars secured to the upturned ends of said yoke, an upper set of rollers carried by the opposite longitudinal ends of said frame bars, a lower set of frame bars, vertical members uniting the upper and lower frame bars, and a lower set of rollers carried by the ends of the lower frame bars.

9. An article carrier as defined in claim 8, and wherein the structure is further characterized by an article-supporting ring rotatably carried by the intermediate portion of said yoke.

10. In conveyor-type storage apparatus: a frame, a pair of vertically disposed transversely spaced endless conveyor belts, rotatable guiding and driving elements carried by said frame, said elements being arranged to cause said belts to travel in registering substantially rectangular orbits in which the belts follow upper and lower longitudinally extending substantially horizontal runs and uniting vertical end runs, article carriers mounted on and arranged between said belts, upper and lower sets of guide rollers mounted on each of said carriers, each of said sets including longitudinally spaced forwardly and rearwardly disposed pairs of said rollers arranged in the same horizontal plane, each of said lower rollers possessing greater width than a complemental upper roller, transversely spaced and vertically extending guide rails carried by said frame, said rails receiving the upper set of rollers of said carriers during movement of the latter horizontally and lengthwise of their orbits of travel, transversely spaced and vertically extending guide rails cooperative with both sets of rollers of said carriers to maintain the latter against lateral movement while traveling vertically along at least part of the length of said last-named rails, the latter presenting inwardly and laterally offset surfaces contacting the widened lower rollers of said carriers on opposite sides thereof to confine said lower rollers to travel in a vertical plane at the ends of the conveyor orbit, said surfaces permitting the upper sets of rollers to pass longitudinally and horizontally across the same without obstruction.

11. In conveyor-type storage apparatus for wearing apparel; an elongated enclosure having a vertical end wall provided with an access opening; a stationary skeleton-type supporting frame disposed within said enclosure; a pair of vertically disposed and transversely spaced endless roller chains; stationary guides on said frame supporting and confining each of said chains for travel in a substantially rectangular orbit; cross members uniting said chains transversely at longitudinally spaced intervals; carriers for articles of wearing apparel depending from said cross members; upper and lower sets of guide rollers supported at the top and bottom of each of said carriers, each of said sets of rollers comprising longitudinally spaced forwardly and rearwardly disposed pairs of the rollers arranged in the same plane; fixed roller-engaging rails carried by said supporting frame, said rails extending horizontally and longitudinally of the frame for the guided travel of said carriers along the same, the upper set of said rollers engaging with the longitudinally extending portion of said rails during horizontal movement of said carriers and the lower set of rollers being free from contact with said rails; and said rails further including at the ends of the enclosure vertically extending sections with which both sets of rollers of each carrier engage during at least a portion of the descent of the carrier to preclude swinging movement on the part of the carriers when the latter are brought into registry with the access opening of the enclosure.

12. In conveyor-type storage apparatus; a supporting frame; a pair of vertically disposed transversely spaced endless roller chains; guides on said frame supporting and confining each of said chains for travel in a substantially rectangular orbit; cross members uniting said chains transversely at longitudinally spaced intervals; article carriers pivotally depending from said cross members and arranged at longitudinally spaced intervals between said chains; longitudinally extending arms having their intermediate portions fulcrumed for oscillatory movement on said cross members; upper sets of guide rollers supported on the outer ends of said arms at the top of each of said carriers; a lower set of arms; rollers mounted on the lower set of arms; and vertical link means uniting said arms at the ends thereof.

FRED LEE STEWART.
MERRILL H. TERRY.

References Cited in the file of this patent

UNITED STATES PATENTS

| Number | Name | Date |
|---|---|---|
| 1,072,007 | Hick | Sept. 2, 1913 |
| 1,542,817 | Bernheim | June 23, 1925 |
| 1,815,738 | MacDonald | July 21, 1931 |
| 1,859,874 | James | May 24, 1932 |
| 1,918,195 | Robertson | July 11, 1933 |
| 1,938,985 | Starr | Dec. 12, 1933 |
| 1,978,205 | Ide | Oct. 23, 1934 |
| 2,603,547 | Zook | July 15, 1952 |

FOREIGN PATENTS

| Number | Country | Date |
|---|---|---|
| 31,424 | France | Nov. 13, 1926 |